United States Patent
Ramjoie et al.

(10) Patent No.: US 7,947,788 B2
(45) Date of Patent: May 24, 2011

(54) PROCESS FOR THE PREPARATION OF A CATALYST COMPONENT FOR THE POLYMERIZATION OF AN OLEFIN

(75) Inventors: Yves Johann Elizabeth Ramjoie, Hermalle-Sous-Argenteau (BE); Sergei Andreevich Sergeev, Novosibirsk (RU); Mark Vlaar, Roermond (NL); Vladimir Aleksandrovich Zakharov, Novosibirsk (RU); Gennadii Dimitrievich Bukatov, Novosibirsk (RU)

(73) Assignee: Saudi Basic Industries Corporation, Riyadh (SA)

( * ) Notice: Subject to any disclaimer, the term of this patent is extended or adjusted under 35 U.S.C. 154(b) by 486 days.

(21) Appl. No.: 11/791,592

(22) PCT Filed: Nov. 11, 2005

(86) PCT No.: PCT/EP2005/012202
§ 371 (c)(1),
(2), (4) Date: Jan. 14, 2008

(87) PCT Pub. No.: WO2006/056338
PCT Pub. Date: Jun. 1, 2006

(65) Prior Publication Data
US 2008/0312389 A1  Dec. 18, 2008

(30) Foreign Application Priority Data
Nov. 26, 2004 (EP) ................................ 04078224

(51) Int. Cl.
*C08F 4/42* (2006.01)
(52) U.S. Cl. .................. 526/124.2; 526/124.3; 526/348; 502/103; 502/115; 502/128; 502/132

(58) Field of Classification Search .................. 526/348, 526/124.2, 124.3; 502/103, 115, 128, 132
See application file for complete search history.

(56) References Cited

U.S. PATENT DOCUMENTS

| 4,315,835 A | * | 2/1982 | Scata' et al. ................ 502/105 |
| 5,229,342 A | | 7/1993 | Job |
| 5,262,573 A | | 11/1993 | Smith et al. |

FOREIGN PATENT DOCUMENTS

| EP | 0 398 698 | | 11/1990 |
| WO | WO 96/32426 | * | 10/1996 |
| WO | WO 96/32427 A | | 10/1996 |
| WO | WO 01/23441 A1 | | 4/2001 |

OTHER PUBLICATIONS

S. Van Der Ven, Polypropylene and Other Polyolefins, Elsevier, 1990, pp. 8-10, vol. 7.

* cited by examiner

*Primary Examiner* — Ling-Siu Choi

(57) ABSTRACT

The invention is directed to a process for the preparation of a catalyst component wherein a compound with formula $Mg(OAlk)_xCl_y$, wherein x is larger than 0 and smaller than 2, y equals 2−x and each Alk, independently represents an alkyl group, is contacted with a titanium tetraalkoxide and/or an alcohol in the presence of an inert dispersant to give an intermediate reaction product and wherein the intermediate reaction product is contacted with titanium tetrachloride in the presence of an internal donor.

The invention also relates to a polymerization catalyst comprising the catalyst component and furthermore the invention relates to the polymerization of an olefin in the presence of the polymerization catalyst comprising the catalyst component.

19 Claims, No Drawings

PROCESS FOR THE PREPARATION OF A CATALYST COMPONENT FOR THE POLYMERIZATION OF AN OLEFIN

The invention is directed to a process for the preparation of a polymerization catalyst component. The invention also relates to a polymerization catalyst comprising the catalyst component and furthermore the invention relates to the polymerization of an olefin in the presence of a polymerization catalyst comprising the catalyst component.

Catalyst components for the preparation of a polyolefin such as for example polypropylene are generally known and the essential elements for the preparation of such catalyst components are a magnesium-containing compound and a titanium compound supported thereon. The preparation of such catalyst components is for instance described in WO-A-96/32427. This publication discloses a 3-step process wherein, in the first two steps a Mg-containing support is prepared, and subsequently the Mg-containing support is contacted with titanium tetrachloride. The catalyst yield obtained with this process is relatively low.

It is the object of the invention to provide a process for the preparation of a polymerization catalyst component and furthermore to provide a polymerization catalyst comprising this catalyst component to obtain a higher catalyst yield during the polymerization of an olefin while maintaining other required characteristics such as for example a high bulk density and a narrow span.

The process according to the invention is characterized in that a compound with formula $Mg(OAlk)_xCl_y$ wherein x is larger than 0 and smaller than 2, y equals 2−x and each Alk, independently, represents an alkyl group, is contacted with a titanium tetraalkoxide and/or an alcohol in the presence of an inert dispersant to give an intermediate reaction product and wherein the intermediate reaction product is contacted with titanium tetrachloride in the presence of an internal donor.

It is an advantage of the process according to the present invention that a catalyst with a higher activity is obtained if before being contacted with the titanium tetrachloride, the solid magnesium containing support, having the formula $Mg(OAlk)_xCl_y$, is treated with titanium tetraalkoxide Ti(OAlk)$_4$ and/or an alcohol AlkOH in the presence of an inert dispersant. The obtained higher activity of the catalyst component means a higher yield of the polyolefin per gram of catalyst. The higher activity reduces the catalyst costs in the polyolefin production.

Generally, the alkyl group Alk of $Mg(OAlk)_xCl_y$ is an alkyl group with 1-8 carbon atoms. The alkyl group may be linear or branched.

Preferably at least one of the Alk-groups represents an ethyl group.

More preferably each Alk-group represents an ethyl group.

Preferably, the titanium tetraalkoxide contains 4-32 C-atoms. The alkoxide group of the titanium tetraalkoxide may be either linear or branched. The four alkoxide groups may be the same or differ independently. These titanium tetraalkoxide compounds may be used alone or in combination.

Preferably, at least one of the alkoxy groups in the titanium tetraalkoxide is an ethoxy group.

More preferably the titanium tetraalkoxide is titanium tetraethoxide.

Suitable alcohols include for instance a linear or branched alcohol with 1-8 C-atoms. The alcohols may be used alone or in combination.

According to a preferred embodiment of the invention the alcohol is ethanol.

Preferably the inert dispersant is a hydrocarbon solvent. The solvent may be for example an aliphatic or aromatic hydrocarbon with 1-20 C-atoms.

According to a preferred embodiment of the invention the dispersant is heptane.

The molar ratio titanium tetraalkoxide to $Mg(OAlk)_xCl_y$ may range between wide limits and is, for instance, between 0.02 and 0.5. Preferably the molar ratio is between 0.07 and 0.2.

Preferably, the molar ratio alcohol to $Mg(OAlk)_xCl_y$ is between 0.02 and 0.5. More preferably this ratio is between 0.07 and 0.2.

Preferably the temperature during the treatment of the compound with formula $Mg(OAlk)_xCl_y$ with the titanium tetraalkoxide and/or alcohol is in the range from −10° C. to 50° C., more preferably in the range from −5° C. to 40° C. and most preferably in the range between 0° C. and 30° C.

Preferably at least one of the reaction components is dosed in time, for instance during 0.5 to 4 hours, particularly during 1-2.5 hours.

According to a preferred embodiment of the invention the process according to the invention is characterized in that a compound with formula $Mg(OAlk)_xCl_y$ wherein x is larger than 0 and smaller than 2, y equals 2−x and each Alk, independently, represents an alkyl group with 1-8 carbon atoms, is contacted with a titanium tetraalkoxide in the presence of an inert dispersant to give an intermediate reaction product and wherein the intermediate reaction product is contacted with titanium tetrachloride in the presence of an internal donor.

Starting from a solid product $(Mg(OAlk)_xCl_y)$ of controlled morphology an intermediate solid reaction product $(Mg(OAlk)_xCl_y.aTi(OAlk)_4$ is obtained after treatment with $Ti(Oalk)_4$ according to the equation $Mg(OAlk)_xCl_y + TiOAlk_4 \rightarrow Mg(OAlk)_xCl_y.aTi(OAlk)_4$. wherein a depends on the selected molar ratio as described in the following. This intermediate reaction product is subsequently contacted with titanium tetrachloride in the presence of an internal donor.

If desired an alcohol may be added before, during or after the treatment with $Ti(OAlk)_4$, or a combination thereof.

In a preferred embodiment of the invention the alcohol is first added to the compound with formula $Mg(OAlk)_xCl_y$ whereafter the tetraalkoxide is added. The alcohol and the tetraalkoxide preferably are added slowly, for instance during 0.5-4 hours, most preferably during 1-2.5 hours, each.

The $TiCl_4$/Mg molar ratio in the contact between the intermediate product and titanium tetrachloride preferably is between 10 and 100, most preferably, between 10 and 50.

Examples of suitable internal donors include carboxylic acids, carboxylic acid anhydrides, esters of carboxylic acids, halide carboxylic acids, alcohols, ethers, ketones, amines, amides, nitriles, aldehydes, alcoholates, sulphonamides, thioethers, thioesters and other organic compounds containing a hetero atom, such as nitrogen, oxygen, sulphur and/or phosphorus.

The molar ratio of the internal donor relative to the magnesium during the treatment of the intermediate product with the titanium tetrachloride may vary between wide limits, for instance between 0.05 and 0.75.

Preferably this molar ratio is between 0.1 and 0.4.

Examples of suitable carboxylic acids are formic acid, acetic acid, propionic acid, butyric acid, isobutanoic acid, acrylic acid, methacrylic acid, maleic acid, fumaric acid, tartaric acid, cyclohexanoic monocarboxylic acid, cis-1,2-cyclohexanoic dicarboxylic acid, phenylcarboxylic acid, toluenecarboxylic acid, naphthalene carboxylic acid, phthalic acid, isophthalic acid, terephthalic acid and/or trimellitic acid.

Anhydrides of the aforementioned carboxylic acids can be mentioned as examples of carboxylic acid anhydrides, such as for example acetic acid anhydride, butyric acid anhydride and methacrylic acid anhydride.

Suitable examples of esters of carboxylic acids are formates, for instance, butyl formate; acetates, for instance ethyl acetate and butyl acetate; acrylates, for instance ethyl acrylate, methyl methacrylate and isobutyl methacrylate; benzoates, for instance methylbenzoate and ethylbenzoate; methyl-p-toluate; ethyl-☐-naphthoate and phthalates, for instance monomethyl phthalate, dibutyl phthalate, diisobutyl phthalate, diallyl phthalate and/or diphenyl phthalate.

Examples of suitable halide carboxylic acids are the halides of the carboxylic acids mentioned above, for instance acetyl chloride, acetyl bromide, propionyl chloride, butanoyl chloride, butanoyl iodide, benzoyl bromide, p-toluoyl chloride and/or phthaloyl dichloride.

Examples of suitable alcohols are methanol, ethanol, butanol, isobutanol, xylenol and benzyl alcohol.

Examples of suitable ethers are diethyl ether, dibutyl ether, diisoamyl ether, anisole and ethylphenyl ether, 2,2-diisobutyl-1,3-dimethoxypropane, 2,2-dicyclopentyl-1,3-dimethoxypropane, 2-ethyl-2-butyl-1,3-dimethoxypropane, 2-isopropyl-2-isopentyl-1,3-dimethoxypropane and/or 9,9-bis(methoxymethyl) fluorene. Also, tri-ethers can be used.

Examples of other organic compounds containing a heteroatom are 2,2,6,6-tetramethyl piperidine, 2,6-dimethylpiperidine, 2-methylpyridine, 4-methylpyridine, imidazole, benzonitrile, aniline, diethylamine, dibutylamine, thiophenol, 2-methyl thiophene, isopropyl mercaptan, diethylthioether, diphenylthioether, tetrahydrofuran, dioxane, dimethylether, diethylether, anisole, acetone, triphenylphosphine, triphenylphosphite, diethylphosphate and/or diphenylphosphate.

Preferably the internal donor is dibutyl phthalate.

Most preferably the internal donor is di-n-butyl phtalate.

In the contact between the intermediate product and the titanium tetrachloride use is preferably made of an inert dispersant. The dispersant may be selected for example from the groups of aliphatic or aromatic hydrocarbon compounds with, for instance, 4-20 C-atoms. The dispersant preferably is chosen such that virtually all side products are dissolved in the dispersant. Suitable dispersants include for example aliphatic and aromatic hydrocarbons and halogenated aromatic solvents with for instance 4-20 C-atoms. Suitable examples are toluene, xylene, benzene, heptane and chlorobenzene.

The reaction temperature during the contact between the intermediate product and the titanium tetrachloride is preferably between 50° C. and 150° C., most preferably between 60° C. and 120° C. At higher or lower temperatures the activity of the catalyst component prepared according to the process of the invention becomes lower. The obtained reaction product is purified, usually with an inert aliphatic or aromatic hydrocarbon or halogenated aromatic compound, to obtain the catalyst component of the invention. If desired, the reaction and subsequent purification may be repeated one or more times.

The preparation of the magnesium containing support having the formula $Mg(OAlk)_x Cl_y$ is well known in the art and several methods are for instance described in U.S. Pat. No. 5,262,573 and references cited therein.

In a preferred embodiment such a magnesium containing support is prepared for instance as described in WO-A-96/32427 and WO-A-01/23441 wherein the magnesium containing support is obtained by:

a) a Grignard formation step wherein metallic magnesium is contacted with an organic halide RX, where R is an organic group, preferably an aromatic group, containing for instance up to 20 carbon atoms and X is a halide, whereupon the resulting dissolved first reaction product is separated from the solid residual products and whereafter, b) an alkoxy group or aryloxy group containing silane compound is contacted with the obtained first reaction product whereupon the precipitate formed is purified. Preferably in step b), a stirred reactor is used.

The Grignard formation step in the process for the preparation of the catalyst component of the invention is carried out by contacting metallic magnesium with an organic halide RX.

All forms of metallic magnesium may be used. Preferably use is made of finely divided metallic magnesium, for example magnesium powder. To obtain a fast reaction it is preferable to heat the magnesium under nitrogen prior to use. In the organic halide RX, R is an organic group preferably containing from 1 up to 20 carbon atoms and X preferably is chlorine or bromine.

Examples of the organic group R are methyl, ethyl, n-propyl, i-propyl, n-butyl, i-butyl, t-butyl, hexyl, octyl, phenyl, tolyl, xylyl, mesityl and benzyl. Combinations of two or more organic halides RX can also be used. Preferably R represents an aromatic group, for instance a phenyl group.

Preferably RX represents chlorobenzene.

The magnesium and the organic halide RX can be reacted with each other without the use of a separate dispersant; the organic halide RX is then used in excess. The organic halide RX and the magnesium can also be brought into contact with one another in the presence of an inert dispersant. Examples of suitable dispersants include aliphatic, alicyclic or aromatic dispersants containing from 4 up to 20 carbon atoms.

Preferably, an excess of chlorobenzene is used as the organic halide RX. Thus, the chlorobenzene serves as dispersant as well as organic halide RX.

Preferably, in the Grignard formation step also an ether is present in the reaction mixture.

Examples of suitable ethers include diethyl ether, diisopropyl ether, dibutyl ether, diisobutyl ether, diisoamyl ether, diallyl ether, tetrahydrofuran (THF) and anisole.

Preferably, the ether is dibutyl ether and/or diisoamyl ether.

The organic halide/ether ratio acts upon the activity of the catalyst component. More generally it acts upon the polymerization performance and the catalyst morphology. The volume ratio organic halide to ether, for instance the ratio chlorobenzene/dibutyl ether, may vary within wide limits, for example between 75:25 and 35:65.

When the organic halide/ether ratio, for instance the chlorobenzene/dibutyl ether ratio, decreases, the bulk density of the polyolefine powder prepared with the aid of the catalyst component becomes lower and when the organic halide/ether ratio increases, the amount of the dissolved first reaction product becomes lower. The ratio at which the best results are obtained depends on the specific reactants and conditions chosen and can easily be determined by the skilled person. For instance when chlorobenzene and dibutylether were used the best results were obtained when the chlorobenzene/dibutyl ether volume ratio was between 70:30 and 50:50.

Small amounts of iodine and/or alkyl halides can be added to cause the reaction between the metallic magnesium and the organic halide RX to proceed at a higher rate. Examples of suitable alkyl halides are butyl chloride, butyl bromide and 1,2-dibromoethane. When the organic halide RX is an alkyl halide, iodine or 1,2-dibromoethane is preferably used.

The reaction temperature for the Grignard formation step may range for instance between 20° C. and 150° C. and the reaction times may range for instance between 0.5 and 20 hours.

After the Grignard formation is completed, the dissolved first reaction product is separated from the solid residual products.

Preferably in step b) the silane compound and first reaction product are introduced simultaneously to a mixing device, such as a static mixer, in order to improve the morphology of the catalyst particles, especially of the larger catalyst particles, as described in WO-A-01/23441. Here, 'morphology' does not only refer to the shape of the catalyst particles, but also to the particle size distribution, its fine content, powder flowability and the bulk density of the catalyst particles. Moreover, it is well known that the polyolefin powder produced in the polymerization by using a catalyst component has the same morphology as the catalyst component (the so-called "replica effect"; see for instance S. van der Ven, Polypropylene and other Polyolefins, Elsevier 1990, p. 8-10). Accordingly almost round polymer particles are obtained with a length/diameter ratio (l/d) smaller than 2 and good powder flowability.

"Simultaneous introduction" means the introduction of the first reaction product and the silane compound in such a way that the molar ratio Mg/Si does not substantially vary during the introduction of these compounds to the mixing device.

The silane compound and first reaction product can be continuously or batch-wise introduced to the mixing device. Preferably, the silane compound and the first reaction product are introduced continuously to the mixing device.

The mixing device can have various forms; the mixing device can be a mixing device in which the silane compound is premixed with the first reaction product, the mixing device can also be the reactor in which the reaction between the silane compound and the first reaction product takes place.

Preferably, the silane compound and the first reaction product are premixed before the mixture is introduced to the reactor for step b). In this way a catalyst component is formed with a morphology that leads to polymer particles with the best morphology (high bulk density, narrow particle size distribution, (virtually) no fines, excellent flowability).

The Si/Mg molar ratio during step b) may vary within wide limits for instance from 0.2 to 20. Preferably, the Si/Mg molar ratio is from 0.4 to 1.0.

Preferably the alkoxy group or aryloxy group containing silane is a compound or a mixture of compounds with the general formula $SiR^1_nOR^2_{4-n}$, wherein n is 0, 1, 2 or 3, preferably n is 0 or 1, each $R^1$, independently, represents an alkyl, alkenyl or aryl group, optionally containing one or more hetero atoms for instance O, N, S or P, with, for instance, 1-20 C-atoms, and each $R^2$, independently, represents an alkyl or aryl group, optionally containing one or more hetero atoms for instance O, N, S or P, with, for instance, 1-20 C-atoms.

Preferably, the silane is tetraethoxysilane.

The period of premixing may vary between wide limits, for instance 0.1 to 300 seconds. Preferably premixing is performed during 1 to 50 seconds.

The temperature during the premixing is not critical and may for instance range between 0 and 80° C.; preferably the temperature is between 10° C. and 50° C.

The reaction between the silane compound and the first reaction product may, for instance, take place at a temperature between −20° C. and 100° C.; preferably at a temperature of from 0° C. to 80° C.

The product obtained with the reaction between the silane compound and the first reaction product, is usually purified by rinsing with an inert solvent, for instance a hydrocarbon solvent with for instance 1-20 C-atoms. It is very suitable to be used as starting material in the process of the present invention for the preparation of a catalyst compound.

The invention is also directed to a polymerization catalyst comprising the catalyst component according to the invention and a co catalyst. Preferably, the catalyst composition also comprises an external donor.

The preparation of polyolefines takes place by polymerising one or more olefins simultaneously or successively in the presence of a catalyst comprising the catalyst component according to the invention, a co catalyst and optionally an external donor.

It is an advantage of the present invention that the amount of metal residues in the obtained polymer is reduced.

The olefins may be for example mono- and diolefins containing from 2 to 10 carbon atoms, such as for example ethylene, propylene, butylene, hexene, octane and/or butadiene.

According a preferred embodiment of the invention the olefin is propylene or a mixture of propylene and ethylene.

Generally, the co catalyst is an organometallic compound containing a metal from group 1, 2, 12 or 13 of the Periodic System of the Elements (Handbook of Chemistry and Physics, 70th Edition, CRC Press, 1989-1990).

Preferably, the co catalyst is an organoaluminium compound. The organoaluminium compound may be, for instance, a compound having the formula $AlR^3_3$, wherein each $R^3$ independently represents an alkyl group with, for instance, 1-10 C-atoms or an aryl group with, for instance, 4-20 C-atoms. Suitable examples of an organoaluminium compound are trimethyl aluminium, triethyl aluminium, ethyl-di-methyl aluminium, triisobutyl aluminium, methyl-ethyl-butyl aluminium and/or trioctyl aluminium.

According to a preferred embodiment of the invention the co catalyst is triethyl aluminium.

Examples of possible external donors are for instance the compounds described above as the internal donors that can be used in the preparation of the catalyst component. As external donor also organo-silicon compounds can be used. Mixtures of external donors can also be used.

Examples of organo-silicon compounds that are suitable as external donor are compounds or mixtures of compounds with the general formula $SiR^4_nOR^5_{4-n}$, wherein n is 0, 1 or 3, preferably n is 1 or 2, each $R^4$, independently, represents an alkyl, alkenyl or aryl group, optionally containing one or more hetero atoms for instance O, N, S or P, with, for instance, 1-20 C-atoms, and each $R^5$, independently, represents an alkyl or aryl group, optionally containing one or more hetero atoms for instance O, N, S or P, with, for instance, 1-20 C-atoms, for instance tetramethoxysilane, tetraethoxysilane, methyltrimethoxysilane, methyltributoxysilane, ethyltriethoxysilane, phenyltriethoxysilane, diethyldiphenoxysilane, n-propyltriethoxysilane, diisopropyldimethoxysilane, diisobutyldimethoxysilane, n-propyltrimethoxysilane, cyclohexylmethyldimethoxysilane, icyclopentyldimethoxysilane, isobutylisopropyldimethoxylsilane, phenyltrimethoxysilane, diphenyldimethoxysilane, trifluoropropylmethyldimethoxysilane, bis(perhydroisoquinolino)dimethoxysilane, dicyclohexyldimethoxysilane, dinorbornyldimethoxysilane, di(n-propyl)dimethoxysilane, di(iso-propyl)dimethoxysilane, di(n-butyl)dimethoxysilane and/or di(iso-butyl)dimethoxysilane.

Preferably the organo-silicon compound is n-propyltrimethoxysilane, cyclohexylmethyldimethoxysilane, di(iso-propyl)dimethoxysilane or di(iso-butyl)dimethoxysilane.

The molar ratio of the metal in the co catalyst relative to the Ti during the polymerization may vary for instance from 5 to 2000. Preferably this ratio is between 50 and 300.

The aluminium/donor molar ratio in the polymerization mixture preferably is between 0.1 and 200; more preferably between 1 and 100.

The polymerization can be carried out in the gas phase or in the liquid phase (bulk or slurry). In the case of polymerization in the liquid phase a dispersing agent is present. Suitable dispersing agents include for instance n-butane, isobutane, n-pentane, isopentane, hexane, heptane, octane, cyclohexane, benzene, toluene, xylene and liquid propylene.

The polymerization conditions such as for example the polymerization temperature and time, monomer pressure, avoidance of contamination of catalyst, choice of polymerization medium in slurry processes, the use of ingredients (like hydrogen) to control polymer molecular weights, and other conditions are well known to persons of skill in the art.

The polymerization temperature may very within wide limits and is, for instance, between 0° C. and 120° C., preferably between 40° C. and 100° C.

The pressure during the polymerization is for instance between 0.1 and 6 MPa, preferably between 0.5-3 MPa.

The molecular weight of the polyolefine obtained during the polymerization can be controlled by adding during the polymerization hydrogen or any other agent known to be suitable for the purpose.

The polymerization can be carried out in continuous mode or batch wise. Slurry-, bulk-, and gas-phase polymerization processes, multistage processes of each of these types of polymerization processes, or combinations of the different types of polymerization processes in a multistage process are contemplated herein.

Preferably the polymerization process is a single stage gas phase process or a multistage, for instance a 2-stage, gas phase process where in each stage a gas-phase process is used.

Examples of gas-phase polymerization processes include both stirred bed reactors and fluidized bed reactor systems; such processes are well known in the art. Typical gas phase α-olefin polymerization reactor systems comprise a reactor vessel to which α-olefin monomer(s) and a catalyst system can be added and which contain an agitated bed of forming polymer particles.

EP-A-398698 discloses a process for producing an olefin polymer by polymerizing an olefin in the presence of a catalyst comprising a solid catalyst component obtained by reacting with heating Mg $(OR^1)_n(OR^2)_{2-n}$, a titanium compound and a silicon compound $Si(OR^4)_4$ and subjecting the resultant reaction product to contact with $TiX_m(OR^5)_{4-m}$ and an electron donating compound. The process according to the present invention is different because of amongst others EP-A-398698 uses Mg $(OR^1)_n(OR^2)_{2-n}$ and a silicon compound $Si(OR^4)_4$ whereas in the process according to the present invention the chlorine containing compound $Mg(OAlk)_xCl_y$ is applied and no silicon compound is present in the reaction between the compound with formula $Mg(OAlk)_xCl_y$ with a titanium tetraalkoxide and/or an alcohol in the presence of an inert dispersant.

U.S. Pat. No. 5,229,342 discloses the production of a solution of a magnesium complex $Mg_3Ti(OR_m)((B(OR_4))_n$ by reaction of magnesium metal, titanium tetraethoxide, triethylborate, ferric chloride and ethanol. In contrast to the process according to the present invention U.S. Pat. No. 5,229,342 discloses amongst others as essential different features the use of the metal magnesium instead of $Mg(OAlk)_xCl_y$, a product in solution instead of a solid product and a boron containing compound $Mg_3Ti(OR_m)((B(OR_4))_n$ instead of the chlorine containing compound $Mg(OAlk)_xCl_y$ $aTi(OAlk)_4$.

The invention will be further elucidated with examples without being limited hereto.

EXAMPLES

Example I

I.A. Grignard Formation Step

A flask, fitted with a reflux condenser and a funnel, was filled with magnesium powder (24.3 g, 1 mol). The flask was brought under nitrogen. The magnesium was heated at 80° C. for 1 hour, after which a mixture of dibutyl ether (170 ml) and chlorobenzene (60 ml) was added. Then iodine (0.03 g) and n-chlorobutane (3 ml) were successively added to the reaction mixture. After the colour of the iodine had disappeared, the temperature was raised to 97° C. and chlorobenzene (220 ml) was slowly added for 2.5 hours. The dark reaction mixture that was formed in the process was stirred for another 8 hours at 97° C. Then the stirring and heating were stopped and the solid material was allowed to settle for 48 hours. By decanting the solution above the precipitate, a solution of phenylmagnesiumchloride ($Ph_xMgCl_{2-x}$, reaction product I.A.) with a concentration of 1.36 mol Mg/l has been obtained. This solution was used in the further catalyst preparation.

I.B. Preparation of the Compound with Formula $Mg(OAlk)_xCl_y$

The solution of reaction product of step 1 (200 ml, 0.272 mol Mg) and 100 ml of a solution of tetraethoxysilane (TES) in dibutyl ether (DBE), (33.4 ml of TES and 66.6 ml of DBE), were cooled to 15° C., and then were dosed simultaneously to a mixing device of 0.45 ml volume supplied with a stirrer and jacket. Thereafter the premixed reaction product I.A and the TES-solution were introduced to a reactor. The mixing device (minimixer) was cooled to 10° C. by means of cold water circulating in the minimixer's jacket. The reagents contact time was 13 s in the minimixer and the connecting tube between the minimixer and the reactor. The stirring speed in the minimixer was 1000 rpm. The mixture formed in the minimixer was introduced to a 0.7 l reactor, with stirring. The reactor was loaded preliminary with 100 ml of DBE, and cooled to 5° C. Dosing time was 1 hour. The stirring speed in the reactor was 200 rpm.

On the dosing completion the reaction mixture was kept at 5° C. for 0.5 hour, then heated up to 60° C. and kept at this temperature for 1 hour. Then the stirring was stopped and the solid substance was allowed to settle. The supernatant was removed by decanting. The solid substance was washed three times using 300 ml of heptane. As a result, a pale yellow solid substance, reaction product I.B, was obtained, suspended in 110 ml of heptane.

I.C. Activation with Titanium Tetraalkoxide

In an inert nitrogen atmosphere at 0° C. a 250 ml glass flask equipped with a mechanical agitator was filled with a slurry of 5 g of reaction product I.B dispersed in 60 ml of heptane. Subsequently a solution of 1.57 ml titaniumtetraethoxide (TET) in 20 ml of heptane was added at 25° C. for 1 hour. The ratio TET/Mg=0.2

The slurry was slowly allowed to warm up to 30° C. for 90 min and kept at that temperature for another 2 hours. Finally the supernatant liquid was decanted from the solid substance (~5.5 g) which was washed once with 90 ml of heptane at 30° C. As a result, reaction product III was obtained, suspended in 15 ml of heptane.

I.D. Preparation of the Catalyst Component

A reactor was brought under nitrogen and 125 ml of titanium tetrachloride was added to it. The reactor was heated to 115° C. and a suspension, containing ~5.5 g of reaction product III in 15 ml of heptane, was added to it under stirring. Then the reaction mixture was kept at 115° C. for 15 min and 2.4 ml of dibutyl phthalate was added to reactor. Then the reaction mixture was kept at 115° C. for 105 min. Then the stirring was stopped and the solid substance was allowed to settle. The supernatant was removed by decanting, after which the solid product was washed with chlorobenzene (125 ml) at 100° C. for 20 min. Then the washing solution was removed by decanting, after which a mixture of titanium tetrachloride (62.5 ml) and chlorobenzene (62.5 ml) was added. The reaction mixture was kept at 115° C. for 30 min, after which the solid substance was allowed to settle, and the last treatment was repeated once again. The solid substance obtained was washed five times using 150 ml of heptane at 60° C., after which the catalyst component, suspended in heptane, was obtained.

I.E. Polymerization of Propylene

Polymerization of propylene was carried out in a stainless steel reactor (with a volume of 0.7 l) in heptane (300 ml) at a temperature of 70° C., total pressure 0.7 MPa and hydrogen presence (55 ml) for 1 hour in the presence of a catalyst comprising the catalyst component according to step I.D, triethylaluminium and propyltrimethoxysilane. The concentration of the catalyst component was 0.033 g/l; the concentration of triethylaluminium was 4.0 mmol/l and the concentration of propyltrimethoxysilane was 0.4 mmol/l.

Data on the catalyst performance during the propylene polymerization are presented in Table 1. The particles of the polymer powder obtained had a round shape.

Example II

Example I was repeated, except for the fact that 0.79 ml of titaniumtetraethoxide (Ti/Mg=0.1) was used in step I.C.

The results are presented in Table 1.

Example III

Example I was repeated, except for the fact that 0.39 ml of titaniumtetraethoxide (Ti/Mg=0.05) was used in step I.C.

The results are presented in Table 1.

Example IV

Example I was repeated, except for the fact that step I.C was performed as described below.

In an inert nitrogen atmosphere at 0° C. a 250 ml glass flask equipped with a mechanical agitator is filled with a slurry of 5 g of reaction product I.B dispersed in 60 ml of heptane. Subsequently a solution of 0.33 ml ethanol (EtOH/Mg=0.15) in 20 ml heptane is dosed under stirring during 1 hour. After keeping the reaction mixture at 0° C. for 30 minutes, a solution of 1.18 ml titaniumtetraethoxide (TET/Mg=0.15) in 20 ml of heptane was added at 0° C. for 1 hour. The slurry was slowly allowed to warm up to 30° C. for 90 min and kept at that temperature for another 2 hours. Finally the supernatant liquid is decanted from the solid reaction product (~5.5 g) which was washed once with 90 ml of heptane at 30° C.

The results are presented in Table 1.

Example V

Example IV was repeated, except for the fact that 0.28 ml of ethanol (EtOH/Mg=0.125) and 0.79 ml of titanium tetraethoxide (Ti/Mg=0.1) were used in step I.C.

The results are presented in Table 1.

Example VI

Example IV was repeated, except for the fact that 0.22 ml of ethanol (EtOH/Mg=0.1) and 0.99 ml of titanium tetraethoxide (Ti/Mg=0.125) were used in step I.C.

The results are presented in Table 1.

Example VII

Example IV was repeated, except for the fact that 0.22 ml of ethanol (EtOH/Mg=0.1) and 0.79 ml of titanium tetraethoxide (Ti/Mg=0.1) were used in step I.C.

The results are presented in Table 1.

Example VIII

Example IV was repeated, except for the fact that step I.C was performed as described below.

In an inert nitrogen atmosphere at 20° C. a 250 ml glass flask equipped with a mechanical agitator is filled with a slurry of 5 g of reaction product I.B. dispersed in 60 ml of heptane. Subsequently a solution of 0.22 ml ethanol (EtOH/Mg=0.1) in 20 ml heptane is dosed under stirring during 1 hour. After keeping the reaction mixture at 20° C. for 30 minutes, a solution of 0.79 ml titaniumtetraethoxide (TET/Mg=0.1) in 20 ml of heptane was added for 1 hour. The slurry was slowly allowed to warm up to 30° C. for 90 min and kept at that temperature for another 2 hours. Finally the supernatant liquid is decanted from the solid reaction product which was washed once with 90 ml of heptane at 30° C.

The results are presented in Table 1.

Example IX

Example IV was repeated, except for the fact that step I.C was performed as described below.

In an inert nitrogen atmosphere at 0° C. a 250 ml glass flask equipped with a mechanical agitator is filled with a slurry of 5 g of reaction product I.B dispersed in 60 ml of heptane. Subsequently a solution of 0.22 ml ethanol (EtOH/Mg=0.1) and 0.99 ml titaniumtetraethoxide (TET/Mg=0.125) in 20 ml heptane is dosed under stirring during 1 hour. The slurry was slowly allowed to warm up to 30° C. for 90 min and kept at that temperature for another 2 hours. Finally the supernatant liquid is decanted from the from the solid reaction product (~5.5 g) which was washed once with 90 ml of heptane at 30° C.

The results are presented in Table 1.

Comparative Example A

Example I was repeated, however without activation step I.C.

The results are presented in Table 1.

Example X

Example VII was repeated, except for the fact that step I.D was performed as described below.

A reactor was brought under nitrogen and titanium tetrachloride (87.5 ml) was added to it. The reactor was heated to 115° C. and a suspension, containing 5 g of reaction product III in 15 ml of heptane, was added to it under stirring. Then the reaction mixture was kept at 115° C. for 15 min and 2 ml of dibutyl phthalate was added to reactor. Then the reaction mixture was kept at 115° C. for 105 min. Then the stirring was stopped and the solid substance was allowed to settle. The supernatant was removed by decanting, after which the solid product was washed with chlorobenzene (87.5 ml) at 100° C. for 20 min. Then the washing solution was removed by decanting, after which a mixture of titanium tetrachloride (44 ml) and chlorobenzene (44 ml) was added. The reaction mixture was kept at 115° C. for 30 min, after which the solid substance was allowed to settle, and the last treatment was repeated once again. The solid substance obtained was washed five times using 150 ml of heptane at 60° C., after which the catalyst component, suspended in heptane, was obtained.

The results are presented in Table 1.

Example XI

Example VII was repeated, except for the fact that step D was performed as described below.

A reactor was brought under nitrogen and mixture of titanium tetrachloride (50 ml) and toluene (50 ml) was added to it. Then a suspension, containing 5 g of reaction product I.C. in 15 ml of heptane, was added to it under stirring at 25° C. The reactor was heated to 115° C., the reaction mixture was kept at 115° C. for 15 min and 1.65 ml of dibutyl phthalate was added to reactor. Then the reaction mixture was kept at 115° C. for 1 hour. Then the stirring was stopped and the solid substance was allowed to settle. The supernatant was removed by decanting, after which the solid product was washed with toluene (100 ml) at 100° C. for 20 min. Then the washing solution was removed by decanting, after which a mixture of titanium tetrachloride (50 ml) and toluene (50 ml) was added. The reaction mixture was kept at 115° C. for 30 min, after which the solid substance was allowed to settle, and the last treatment was repeated once again. The solid substance obtained was washed five times using 150 ml of heptane at 60° C., after which the catalyst component, suspended in heptane, was obtained.

The results are presented in Table 1.

Example XII

Example XI was repeated, except for the fact that chlorobenzene was used instead of toluene when step I.D was performed.

The results are presented in Table 1.

TABLE 1

| Example | Ti wt % | Activity $kg_{PP}/g_{cat}$ | $^aPP$ wt % | BD g/100 ml | span |
|---|---|---|---|---|---|
| I | 2.0 | 14.9 | 0.5 | 46 | 0.4 |
| II | 2.1 | 15.6 | 0.6 | 47 | 0.3 |
| III | 2.2 | 13.2 | 0.7 | 47 | 0.3 |
| IV | 2.3 | 16.2 | 0.6 | 46 | 0.5 |
| V | 2.1 | 16.3 | 0.4 | 47 | 0.3 |
| VI | 2.0 | 18.6 | 0.5 | 46 | 0.3 |
| VII | 2.0 | 15.5 | 0.5 | 46 | 0.3 |
| VIII | 1.9 | 13.6 | 0.5 | 46 | 0.4 |
| IX | 2.0 | 16.0 | 0.4 | 47 | 0.5 |
| X | 2.2 | 14.8 | 0.4 | 46 | 0.4 |
| XI | 2.2 | 16.0 | 0.4 | 47 | 0.3 |
| XII | 2.1 | 15.0 | 0.5 | 46 | 0.3 |
| A | 1.8 | 11.4 | 0.5 | 47 | 0.3 |

Abbreviations and Measuring Methods:
Ti is the weight content in % of titanium in the catalyst component
Activity $kg_{PP}/g_{cat}$ is the amount of polypropylene obtained per gram of catalyst component.
The weight percentage of atactic polypropylene ($^aPP$) was determined as follows: 100 ml of the filtrate (y ml) obtained in separating the polypropylene powder (x g) and the heptane was dried over a steam bath and then under vacuum at 60° C. That yielded z g of $^aPP$. The total amount of $^aPP$ (q g) is: (y/100)*z.
The weight percentage of $^aPP$ is: (q/(q+x))*100%.
The bulk density (BD) of the polypropylene powder was determined according to ASTM D1895.
The span of PP powder was determined according to ASTM D1921, method A.

The invention claimed is:
1. A process for the preparation of a polymerization catalyst component wherein a compound with formula $Mg(OAlk)_xCl_y$, wherein x is larger than 0 and smaller than 2, y equals 2−x and each. Alk, independently, represents an alkyl group, is contacted with a titanium tetraalkoxide in the presence of an inert dispersant to give an intermediate reaction product and wherein the intermediate reaction product is contacted with titanium tetrachloride in the presence of an internal donor.
2. The process according to claim 1 wherein at least one of the Alk-groups is an ethyl group.
3. The process according to claim 1 wherein at least one of the alkoxide groups in titanium tetraalkoxide is an ethoxy group.
4. The process according to claim 3, wherein the titanium alkoxide is titanium tetraethoxide.
5. The process according to claim 1 wherein the dispersant is heptane.
6. The process according to claim 1 wherein the compound with formula $Mg(OAlk)_xCl_y$ is contacted with the titanium tetraalkoxide and/or alcohol at a temperature in the range of −10° C. to 50° C.
7. The process according to claim 1 wherein the molar ratio of titanium tetraalkoxide to $Mg(OAlk)_xCl_y$ is between 0.02 and 0.5.
8. The process according to claim 1 wherein the alcohol is ethanol.
9. The process according to claim 1 wherein the molar ratio of alcohol to $Mg(OAlk)_xCl_y$ is between 0.02 and 0.5.
10. The process according to claim 1 wherein a compound with formula $Mg(OAlk)_xCl_y$ is prepared in a process wherein a metallic magnesium is contacted with an organic halide RX, where R is an organic group containing up to 20 carbon atoms and X is a halide, to form a resulting dissolved first reaction product, whereupon the resulting dissolved first reaction product is separated from solid residual products and whereafter, an alkoxy group or aryloxy group containing silane compound is added to the resulting dissolved first reaction product, whereupon a precipitate is formed and purified to obtain the compound with formula $Mg(OAlk)_xCl_y$.

11. The process according to claim 10, wherein the alkoxy group or aryloxy group containing silane compound and the resulting dissolved first reaction product are introduced simultaneously to a mixing device and wherein the mixing device is a static mixer.

12. A polymerization catalyst comprising a catalyst component comprising a reaction product of the following in the order of:
   a) a compound with formula $Mg(OAlk)_xCl_y$ wherein x is larger than 0 and smaller than 2, y equals 2−x and each Alk, independently, represents an alkyl group,
   b) a titanium tetraalkoxide and, optionally, an alcohol, and
   c) an inert dispersant, and
   d) titanium tetrachloride, and
   e) an internal donor;
and a co-catalyst.

13. The catalyst according to claim 12 wherein the co-catalyst is an organometallic compound containing a metal from group 1, 2, 12 or 13 of the Periodic System of the Elements.

14. The catalyst according to claim 12 wherein the reaction product is of the following in the order of:
   a) a compound with formula $Mg(OAlk)_xCl_y$ wherein x is larger than 0 and smaller than 2, y equals 2−x and each Alk, independently, represents an alkyl group,
   b) an alcohol,
   c) a titanium tetraalkoxide, and
   d) an inert dispersant, and
   e) titanium tetrachloride, and
   f) an internal donor.

15. A process for preparation of polyolefins comprising polymerization of one or more olefins in the presence of a polymerization catalyst comprising a catalyst component comprising a reaction product of the following in the order of:
   a) a compound with formula $Mg(OAlk)_xCl_y$ wherein x is larger than 0 and smaller than 2, y equals 2−x and each Alk, independently, represents an alkyl group,
   b) a titanium tetraalkoxide and, optionally, an alcohol, and
   c) an inert dispersant, and
   d) titanium tetrachloride, and
   e) an internal donor;
and a co-catalyst.

16. The process according to claim 15 wherein the olefin is propylene or a mixture of propylene and ethylene.

17. The process according to claim 1 wherein the compound with formula $Mg(OAlk)_xCl_y$ is contacted with the titanium tetraalkoxide and an alcohol.

18. The process according to claim 17 wherein the alcohol is first added to the compound with formula $Mg(OAlk)_xCl_y$, whereafter the titanium tetraalkoxide is added.

19. The process according to claim 15 wherein the reaction product is of the following in the order of
   a) a compound with formula $Mg(OAlk)_xCl_y$ wherein x is larger than 0 and smaller than 2, y equals 2−x and each Alk, independently, represents an alkyl group,
   b) an alcohol
   c) a titanium tetraalkoxide
   d) an inert dispersant, and
   e) titanium tetrachloride, and
   f) an internal donor.

* * * * *